May 6, 1941.                G. McCORMICK ET AL                2,240,708
                         LOCOMOTIVE CRANKPIN BEARING
                             Filed Nov. 29, 1938
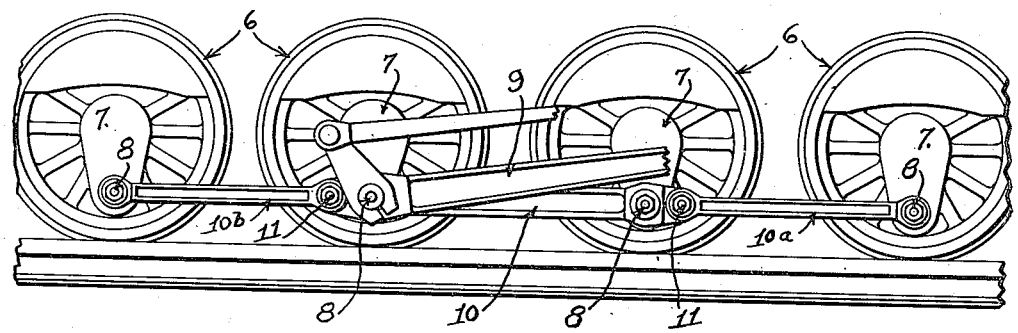
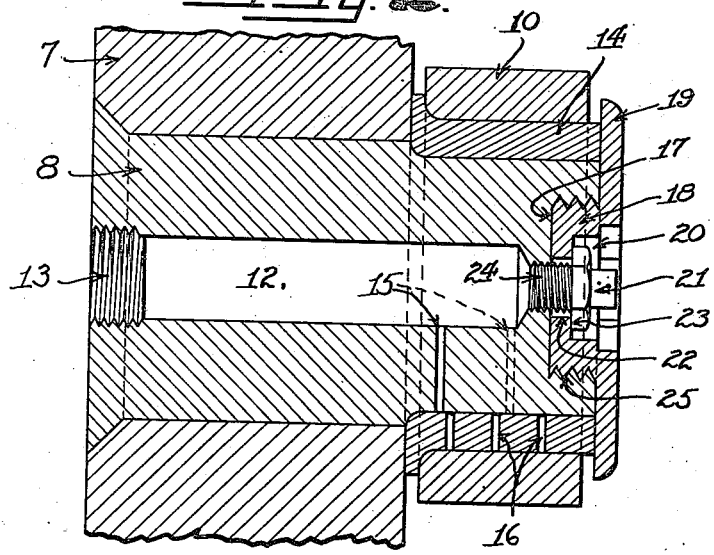
INVENTORS,
George McCormick,
Ben M. Brown,
BY Frank E. Russell.
Booth & Booth
ATTORNEYS Patented May 6, 1941

2,240,708

UNITED STATES PATENT OFFICE 2,240,708

LOCOMOTIVE CRANKPIN BEARING

George McCormick, Redwood City, Ben M. Brown, Palo Alto, and Frank E. Russell, Alameda, Calif.

Application November 29, 1938, Serial No. 242,948

3 Claims. (Cl. 308—78)

The present invention relates to crankpin and connecting rod bearings for locomotives.

It has been customary in the past to lubricate the connecting rod bearings of locomotives by drilling a hole through the eye of the connecting rod and fitting an oil cup or grease cup therein. The drilling of the eye of the connecting rod weakens the same materially and provides a point from which a fracture may start. Experience has shown that the failures of connecting rod ends are contributed to by the lubricant holes therein.

The object of the present invention is to provide means for lubricating the connecting rod bearings from within the crankpins, to the end that there shall be no holes in the eyes of the rod ends. Another object of the invention is to provide means for feeding the lubricant to the surfaces of the bearings at an appropriate rate so that there will be adequate lubrication without waste of the lubricant.

Other objects and advantages of the invention will become apparent from the following specification in which a preferred form of the invention and a modification thereof are described. It should be understood, however, that changes within the scope of the claims hereto appended may be made in the form, construction and arrangement of the several parts herein shown and described, without departing from the spirit of the invention as defined in said claims.

In the drawing:

Fig. 1 is a side elevation of the driving wheels and connecting rods of a locomotive.

Fig. 2 is a longitudinal section of the crankpin bearing of one of the forward wheels.

Referring more particularly to the drawing, the reference numerals 6 designate the driving wheels of a locomotive, each having a crank 7. The cranks are provided with crankpins 8, upon which the connecting rods are journalled.

The main connecting rod is shown at 9, and is journalled in this particular installation upon the crankpin 8 of the third wheel. The crankpins of all the wheels are connected together by the side rods in the usual manner, said side rods consisting of an intermediate section 10, a forward section 10a, and a rear section 10b. The intermediate side rod 10 has its ends journalled upon the crankpins 8 of the second and third wheels respectively, and is connected with the forward and rear rods 10a and 10b by the usual knuckle pin joints 11.

Our improved crankpin bearing is applicable to any of the crankpins 8 of Fig. 1, but has particular advantages when applied to either of the two forward wheels, whose crankpins are overlapped by the main rod 9. The lateral clearance between said main rod and the ends of the forward crankpins is necessarily small, but our construction provides adequate internal lubrication of the crankpin bearing in spite of such restricted clearance.

The crankpin 8, as shown in Fig. 2, is hollow, providing an interior reservoir 12 for a supply of lubricant. A plug 13 permanently closes the inner end of said reservoir. A journal bushing 14 surrounds the outer end portion of the pin 8, and is rotatable thereon. The eye of the side rod 10 surrounds said bushing, which may be either fixed or rotatable in said eye. There are no holes or apertures of any kind through the eye of the rod 10 to cause points of weakness at which fractures might start.

The crankpin 8 has substantially radially directed grease holes 15 drilled through it to permit the grease to pass out from the reservoir 12 to the bearing surface of the bushing 14. The passages 15 are preferably arranged out of line with each other, in order to avoid weakening the pin 8. The passages 15 are also preferably directed toward the outside of the wheel so that as the wheel revolves the grease within the reservoir 12 is impelled outwardly through said passages by centrifugal force.

In order to lubricate the outer surface of the bushing 14 if it is rotatable in the rod end, it is provided with a number of holes 16 in suitably spaced and preferably staggered relation to the holes 15. The outer end of the pin 8 is recessed as shown at 17, and into this recess is screwed a plug 18 having a peripheral flange 19 extending outwardly beyond the periphery of the pin 8 in order to hold the bearing thereon. The outer face of the plug 18 is provided with a recess 20 shaped to receive a plug wrench, not shown, by means of which the plug 18 can be removed and replaced.

A grease connection 21 is screwed into the bore in the end of the crankpin 8, and extends outwardly through a central hole 22 in the plug 18. The grease connection 21 is of the well known type adapted for use with a pressure grease gun and containing a check valve, not shown, to permit entrance of grease into the reservoir 12 but not its escape therefrom. A flange 23 on the grease connection abuts against the bottom of the recess 20 in said plug. The grease connection thus acts as a locking device to prevent accidental unscrewing of the plug 18, and in order to make its locking function more effective the threads 24 of the grease connection have a different characteristic, or are cut in the opposite direction, from the threads 25 of the plug. The construction last described provides a securely locked flange, as shown at 19, to prevent the bearing from sliding off the crank pin endwise, and also provides the recess 20 in which the grease connection is mounted so that no portion of it extends out beyond the plane of the outer surface of said flange. The grease connection, it will be noted, has a double function, serving both as a means to introduce the grease into the reservoir 12 and as a locking device to secure the bearing flange 19 in place.

The described arrangement of the grease holes 15, i. e. directed radially outwardly toward the periphery of the wheel, provides a variable supply of lubricant to the crankpin bearing approximately according to its demands, and thus insures adequate lubrication of said bearing while preventing waste of lubricant. When the wheel is stationary and the bearing is cold, the grease will not flow out through the restricted holes 15, even though the position of the wheel causes said holes to be directed downwardly. But, when the bearing warms up and the wheel is revolving, the grease is impelled outwardly to the bearing by centrifugal force, and the higher the speed and the higher the temperature of the bearing, the greater will be the pressure due to centrifugal force and the lower will be the viscosity of the grease, and therefore more grease will be supplied to the bearing surfaces when the need is greater.

We claim:

1. A locomotive crankpin bearing comprising a crankpin formed with a threaded recess in its outer end and a bore extending from said recess longitudinally through the pin, means closing the inner end of said bore to form an interior chamber for containing grease, and said chamber having a passage extending outwardly to the bearing surface of the pin, interior threads in the outer end of said chamber, said threads having a characteristic different from that of the threads of said recess, a connecting rod having an eye surrounding said pin and having a bearing thereupon, a plug screwed into said recess, said plug having a peripheral flange of greater diameter than that of the bearing surface, and a grease connection screwed into the threads of said chamber, said grease connection having a shoulder bearing against said plug and being adapted to admit lubricant to said chamber and retain it therein.

2. A locomotive crankpin bearing comprising a crankpin having a bore extending through it from end to end to form an interior grease containing chamber and said chamber having a passage extending outwardly to the bearing surface of said pin, means closing the inner end of said chamber, the outer end of said pin having two sets of threads of different characteristic, a connecting rod having an eye surrounding said pin and having a bearing thereupon, an end member having engagement with one of said sets of threads, said member having a portion extending beyond the bearing surface to hold the eye of said rod thereon, and a grease connection having engagement with the other of said sets of threads, said grease connection having a portion engaging said end member to lock it upon said pin and being adapted to admit grease to said chamber and retain it therein.

3. A locomotive crankpin bearing comprising a crankpin having an interior grease chamber and a recess in its outer end, said pin having an axially disposed interiorly threaded passage connecting said chamber with said recess, interior threads of different characteristic from said passage threads formed in the peripheral wall of said recess, a plug screwed into the threads of said recess, said plug having an aperture aligned with said passage, a peripheral flange on said plug extending outwardly beyond the outer bearing surface of the pin, a grease connection having a stem extending through the aperture of said plug and screwed into the threads in the passage of said pin, and an exterior flange on said grease connection bearing against said plug to lock the same in position.

GEORGE McCORMICK.
BEN M. BROWN.
FRANK E. RUSSELL.